United States Patent Office.

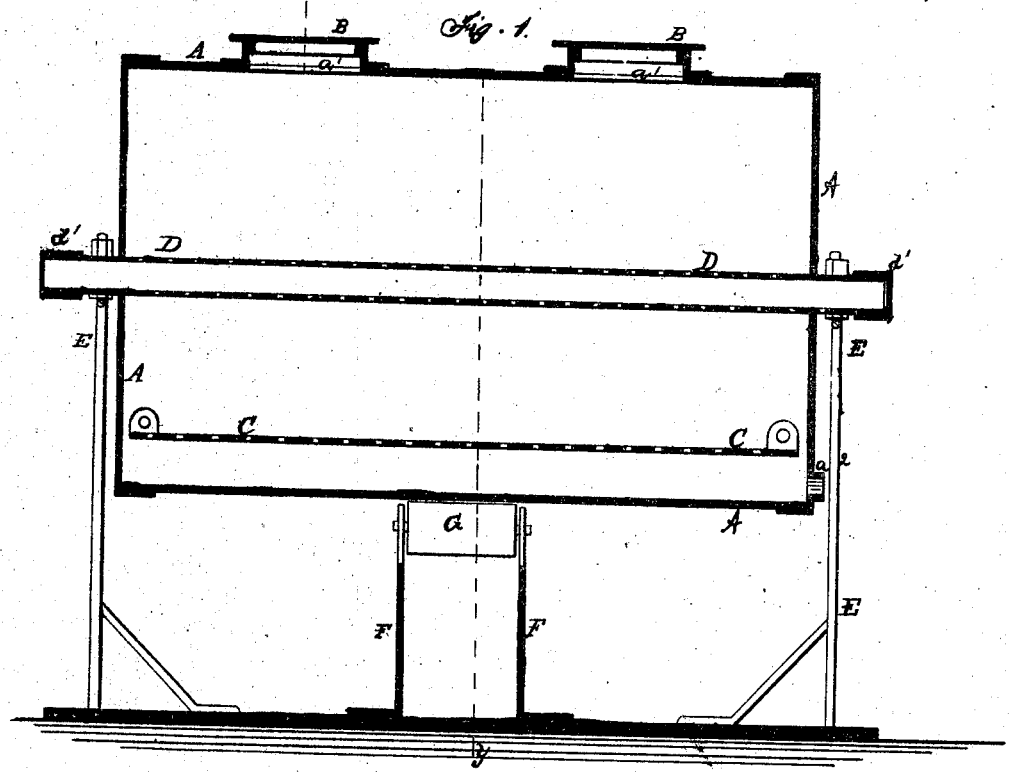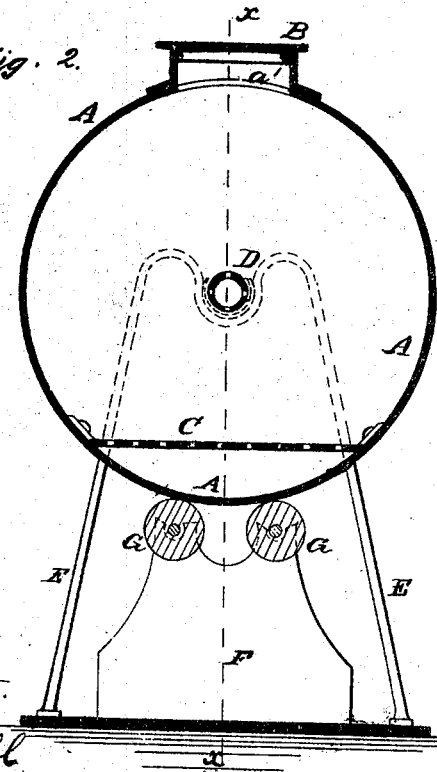

S. J. PATTERSON, OF BRIDGEPORT, CONNECTICUT.

*Letters Patent No. 75,571, dated March 17, 1868.*

IMPROVED APPARATUS FOR LEACHING BARK AND OTHER MATERIALS.

*The Schedule referred to in these Letters Patent and making part of the same.*

TO ALL WHOM IT MAY CONCERN:

Be it known that I, S. J. PATTERSON, of Bridgeport, in the county of Fairfield, and State of Connecticut, have invented a new and useful Improvement in Bark-Leach; and I do hereby declare that the following is a full, clear, and exact description thereof, which will enable others skilled in the art to make and use the same, reference being had to the accompanying drawings, forming part of this specification.

Figure 1 is a longitudinal central section of my improved apparatus, taken through the line $x\ x$, fig. 2.

Figure 2 is a vertical cross-section of the same, taken through the line $y\ y$, fig. 1.

Similar letters of reference indicate corresponding parts.

My invention has for its object to furnish an improved leach for leaching bark and other substances which shall be simple in construction, easily operated, and effective in operation; and it consists in the construction and combination of the various parts, as hereinafter more fully described.

A is the body of the leach, which is made cylindrical in form, and has one or more openings, $a^1$, formed in its upper side, through which the bark is inserted and removed.

The openings $a^1$ are closed with removable caps, B, which may be secured in place by bolts and keys, or in any other substantial and convenient manner.

In one of the ends of the cylinder A is formed an opening, $a^2$, through which the liquor may be drawn off when desired.

C is a screen or strainer, extending longitudinally across the cylinder A, through which the liquor passes or drains into the space below said strainer, from which it is drawn off through the opening $a^2$. The strainer C should be removable, being secured in place by buttons or other well-known means, so that it may be removed and cleaned should it or the space beneath it become choked up or clogged with fine bark.

D is a hollow shaft, extending longitudinally through the centre of the cylinder A, and projecting at both ends, upon which the said cylinder revolves. The hollow shaft D, within the cylinder A, is perforated with numerous small holes, as shown in figs. 1 and 2. The projecting ends of the hollow shaft D rest in bearings formed in the supports or framework E, and they are closed with removable caps, $d'$.

F is a framework, placed beneath the cylinder A, in the upper part of which are placed two or more friction-rollers, G, in such positions as to support the weight of said cylinder, and relieve the hollow shaft D from having to sustain the immense weight of said cylinder when filled.

The cylinder A may be revolved, when required, by means of gearing attached to said cylinder, or by means of a pulley attached to the projecting end of the hollow shaft D.

In using the apparatus, the cylinder A is filled with bark, and enough water put in to about half fill the said cylinder. It is then slowly revolved until all the bark is thoroughly saturated. Steam is then introduced through the perforated hollow shaft D by coupling the steam-pipe to one or the other of the projecting ends of the said shaft, as may be most convenient, until the whole contents of the cylinder A are thoroughly heated up and steeped. The liquor is drawn off through the opening $a^2$, after which the bark may be again leached one or more times in the same manner. When the strength of the bark has been wholly exhausted, the caps B are removed, and the cylinder A revolved into an inverted position, allowing the spent bark to flow out through the openings $a^1$.

I claim as new, and desire to secure by Letters Patent—

1. A horizontal cylindrical revolving leach, A, constructed with a removable screen or strainer, C, and with openings $a^1$ and $a^2$, substantially as herein shown, and for the purpose set forth.

2. The combination of the perforated hollow shaft D with the cylinder A, substantially as herein shown and described, and for the purposes set forth.

3. The combination of the supporting friction-rollers G with the revolving cylindrical leach A, substantially as herein shown and described, and for the purpose set forth.

The above specification of my invention signed by me, this 23d day of January, 1868.

S. J. PATTERSON.

Witnesses:
 JOHN E. REED,
 M. H. TOMLINSON.